US012529982B2

(12) United States Patent
Asano

(10) Patent No.: US 12,529,982 B2
(45) Date of Patent: Jan. 20, 2026

(54) IMAGE FORMING APPARATUS USING ELECTROPHOTOGRAPHIC METHOD AND POWER SUPPLY APPARATUS THEREOF

(71) Applicant: CANON KABUSHIKI KAISHA, Tokyo (JP)

(72) Inventor: Hiroki Asano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 18/437,493

(22) Filed: Feb. 9, 2024

(65) Prior Publication Data

US 2024/0272569 A1 Aug. 15, 2024

(30) Foreign Application Priority Data

Feb. 10, 2023 (JP) ................................ 2023-019467

(51) Int. Cl.
*G03G 15/16* (2006.01)
*G03G 15/00* (2006.01)

(52) U.S. Cl.
CPC ....... *G03G 15/1675* (2013.01); *G03G 15/161* (2013.01); *G03G 15/5004* (2013.01); *G03G 15/556* (2013.01)

(58) Field of Classification Search
CPC ............. G03G 15/1675; G03G 15/161; G03G 15/5004; G03G 15/556
USPC ............................................................ 399/66
See application file for complete search history.

(56) References Cited

U.S. PATENT DOCUMENTS

| | | | | |
|---|---|---|---|---|
| 5,111,247 A * | 5/1992 | Nichols | G03G 15/0849 366/142 |
| 6,785,479 B2 * | 8/2004 | Naito | G03G 15/086 399/45 |
| 2015/0030342 A1 * | 1/2015 | Yoshioka | G03G 15/80 399/314 |

FOREIGN PATENT DOCUMENTS

| | | |
|---|---|---|
| JP | 2012-103596 A | 5/2012 |
| JP | 2016-004140 A | 1/2016 |
| JP | 2018-194685 A | 12/2018 |
| JP | 2021-056360 A | 4/2021 |

* cited by examiner

*Primary Examiner* — Stephanie E Bloss
*Assistant Examiner* — Michael A Harrison
(74) *Attorney, Agent, or Firm* — Venable LLP

(57) ABSTRACT

An image forming apparatus comprises a sensor provided in a toner container and is configured to detect information regarding a remaining amount of toner contained in the toner container. An AC power supply supplies an AC voltage to the sensor. A DC power supply generates a DC voltage in a given polarity by converting the AC voltage output from the AC power supply, and applies the DC voltage in the given polarity to a primary transfer member.

11 Claims, 9 Drawing Sheets

IMAGE FORMING APPARATUS USING ELECTROPHOTOGRAPHIC METHOD AND POWER SUPPLY APPARATUS THEREOF

BACKGROUND OF THE INVENTION

Field of the Invention

The present disclosure relates to an image forming apparatus using an electrophotographic method and a power supply apparatus thereof.

Description of the Related Art

In an image forming apparatus, a toner image formed on a photosensitive member is transferred to an intermediate transfer member (primary transfer), and furthermore, the toner image is transferred from the intermediate transfer member to a sheet (secondary transfer). By applying a primary transfer voltage to a primary transfer roller, a current flows from the primary transfer roller to the photosensitive member, and transferring of the toner image is prompted. According to Japanese Patent Laid-Open No. 2016-004140, a power supply circuit for generating the primary transfer voltage is described.

The primary transfer voltage is a high voltage, and therefore the cost of the power supply circuit is high, and the arrangement space thereof tends to increase.

SUMMARY OF THE INVENTION

The present disclosure provides an image forming apparatus comprising: a toner container that contains toner; a photosensitive member on which a toner image is formed with the toner supplied from the toner container; an intermediate transfer member that has a conductivity and rotates while in contact with the photosensitive member; a primary transfer member that is applied with a primary transfer voltage and transfers the toner image from the photosensitive member to the intermediate transfer member; a sensor that is provided in the toner container and is configured to detect information regarding a remaining amount of the toner contained in the toner container; an AC power supply configured to supply an AC voltage to the sensor; and a first DC power supply configured to generate a DC voltage in a first polarity by converting the AC voltage output from the AC power supply, and apply the DC voltage in the first polarity to the primary transfer member.

Further features of the present disclosure will become apparent from the following description of exemplary embodiments (with reference to the attached drawings).

DESCRIPTION OF THE EMBODIMENTS

Figure 1:
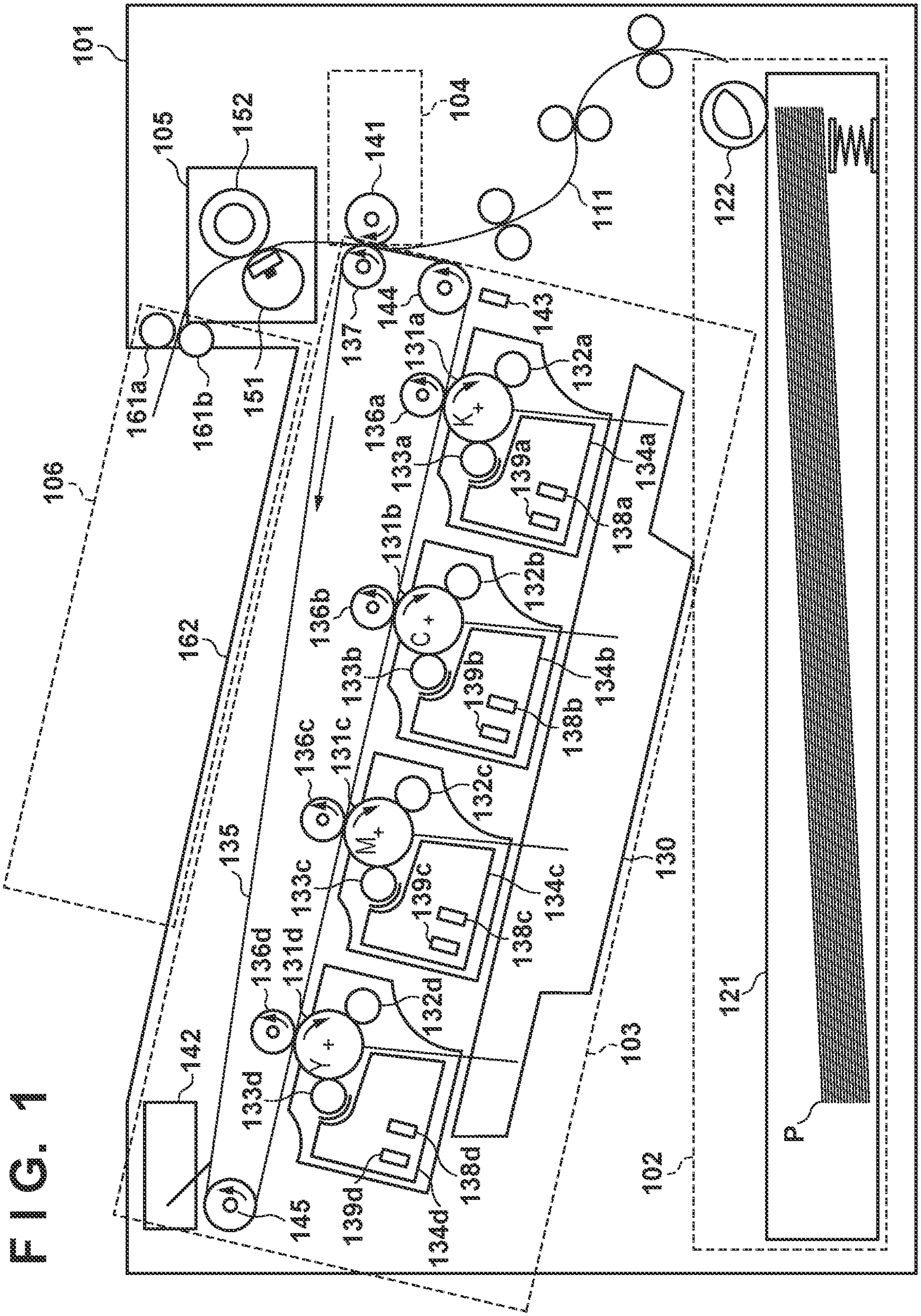
FIG. 1 is a schematic cross-sectional configuration diagram of an image forming apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Embodiment 1

(1) Structure of Image Forming Apparatus

FIG. 1 is a cross-sectional view of an image forming apparatus 101. A feeding unit 102 feeds sheets P to a conveyance path 111. An image forming unit 103 forms an image on an intermediate conveyance belt 135 using toner of different colors, namely black "K", cyan "C", magenta "M", and yellow "Y". The intermediate conveyance belt 135 moves in an arrow direction shown in FIG. 1. A transfer unit 104 transfers a toner image from the intermediate conveyance belt 135 to a sheet P. A fixing unit 105 fixes a toner image on a sheet P. A discharging unit 106 discharges a sheet P to the outside of the image forming apparatus 101.

A feeding unit 102 includes a feeding tray 121 and a feeding roller 122. The feeding tray 121 is a feeding storage that stores sheets (print media) on which printing is performed. The feeding roller 122 feeds sheets one by one from the feeding tray 121 to the conveyance path 111.

The image forming unit 103 includes four print stations corresponding to the KCMY colors. The structures of the four stations are the same, and therefore characters "abcd" at the end of reference signs may be omitted in this description.

A charging roller 132 is arranged so as to be in opposing-contact with the photosensitive drum 131 with a fixed gap. With a discharge phenomenon that occurs at a gap between the charging roller 132 and the photosensitive drum 131, a surface of the photosensitive drum 131 is uniformly charged (charging process). An exposure device 130 outputs laser light according to an image signal, exposes the surface of the photosensitive drum 131 with the laser light, and with this, an electrostatic latent image is formed (exposing process). A developing roller 133 causes toner supplied from a toner container 134 to be attached to the photosensitive drum 131, and forms a toner image from the electrostatic latent image (developing process). The toner container 134 includes an electrode plate 138 and an electrode plate 139. By applying an AC voltage Vton_ac between the electrode plate 138 and the electrode plate 139, the electrostatic capacitance between the electrode plate 138 and the electrode plate 139 is detected. This electrostatic capacitance changes according to the amount of toner that is present between the electrode plate 138 and the electrode plate 139. Accordingly, the electrostatic capacitance is information related to the remaining toner amount, and shows correlation with the remaining toner amount.

A high voltage (hereinafter, may also be referred to as a voltage) is applied to constituent components of the image forming unit 103 and the transfer unit 104. The portions to which the voltage is specifically applied are the charging rollers 132*a*, 132*b*, 132*c*, and 132*d*, the developing rollers 133*a*, 133*b*, 133*c*, and 133*d*, primary transfer rollers 136*a*, 136*b*, 136*c*, and 136*d*, and a secondary transfer roller 141. The image forming apparatus 101 charges the toner to a negative polarity. Therefore, negative polarity voltages are applied to the charging rollers 132*a*, 132*b*, 132*c*, and 132*d*, and the developing rollers 133*a*, 133*b*, 133*c*, and 133*d*. On the other hand, positive polarity voltages are applied to the primary transfer rollers 136*a*, 136*b*, 136*c*, and 136*d* and the secondary transfer roller 141.

The primary transfer roller 136 is arranged so as to be in contact with an inner circumferential surface of the intermediate conveyance belt 135. The primary transfer roller 136 transfers a toner image from the photosensitive drum 131 to the intermediate conveyance belt 135. The primary transfer roller 136 includes a metal cored bar. A primary transfer voltage for prompting transferring of a toner image is applied to the cored bar. The primary transfer voltage is a DC high voltage. The photosensitive drum 131 is connected to GND (ground) wiring. An electric field is generated from the cored bar of the primary transfer roller 136 to which a positive polarity primary transfer voltage is applied toward the photosensitive drum 131. With this, negatively charged toner moves from the photosensitive drum 131 to the intermediate conveyance belt 135. The toner images of respective YMCK colors are sequentially transferred to the intermediate conveyance belt 135 in this way, and as a result, a full color image is formed.

The intermediate conveyance belt 135 is stretched on the primary transfer rollers 136*a*, 136*b*, 136*c*, and 136*d*, the opposing roller 137, a tension roller 144, and a driving roller 145. The intermediate conveyance belt 135 is driven to rotate by the driving roller 145. A cleaning blade 142 removes toner remained on the intermediate conveyance belt 135. Note that an image sensor 143 reads a test image formed on the intermediate conveyance belt 135. The read result may be used for color shift correction, tone correction, an adjustment of the image forming condition, and the like.

A secondary transfer voltage is applied to a cored bar of the secondary transfer roller 141 of the transfer unit 104. With this, the secondary transfer roller 141 transfers a toner image from the intermediate conveyance belt 135 to a sheet P. The secondary transfer voltage is a DC high voltage. Note that the intermediate conveyance belt 135 has a conductivity, and the secondary transfer voltage applied to the secondary transfer roller 141 also acts on the primary transfer roller 136 via the intermediate conveyance belt 135. For example, the intermediate conveyance belt 135 can be configured by overlaying a plurality of thin films, and an inner surface layer of the plurality of thin films is formed by a material having conductivity, and the inner surface layer has a lower surface resistance than an outer surface layer. Accordingly, an electric field for prompting transferring toner is generated between the intermediate conveyance belt 135 and each photosensitive drum 131.

The fixing unit 105 includes a fixing roller 151 and a pressure roller 152. The fixing roller 151 and pressure roller 152 supply heat and pressure to a sheet P, and as a result, a toner image is fixed on a sheet P.

The discharging unit 106 includes discharging rollers 161*a* and 161*b* and a discharging tray 162. The discharging rollers 161*a* and 161*b* discharge a sheet P to a discharging tray 162.

(2) Voltages Used in Image Forming Apparatus

While images are formed, the toner container 134 charges toner to a negative polarity, which is a normal charged polarity, by stirring the toner. Therefore, a positive polarity voltage, which is an opposite polarity to the charged polarity, is applied to the primary transfer roller 136. Similarly, a positive polarity voltage is applied to the secondary transfer roller 141.

Incidentally, a portion of the toner transferred to the intermediate conveyance belt 135 remains on the surface of the intermediate conveyance belt 135, without being transferred to a sheet P. In particular, a test image is not transferred to a sheet P, and therefore a portion of the test image is attached to the secondary transfer roller 141. This toner is scraped by the cleaning blade 142. The scattered toner may be attached to a surface of the secondary transfer roller 141 by being attracted by the positive voltage applied to the secondary transfer roller 141. Therefore, when an image formation is ended, a negative polarity voltage (cleaning voltage) is applied to the secondary transfer roller 141 (cleaning process). Accordingly, the toner attached to the surface of the secondary transfer roller 141 is returned to the surface of the intermediate conveyance belt 135. Then, the toner is removed from the intermediate conveyance belt 135 by the cleaning blade 142.

Also, discharging may occur between toner carried on the surface of the intermediate conveyance belt 135 and a certain photosensitive drum 131, and the toner may be positively charged. The positively charged toner is conveyed downstream by the intermediate conveyance belt 135. Then, the positively charged toner is attracted to another photosensitive drum 131 that is negatively charged. For example, assume that discharging occurs at the magenta photosensitive drum 131*c*. In this case, the positively charged magenta toner is attached to the cyan photosensitive drum 131*b* that is negatively charged. Therefore, a negative voltage is applied to the primary transfer rollers 136*a*, 136*b*, 136*c*, and 136*d*. Accordingly, the positive toner attached to the surfaces of the photosensitive drums 131*a*, 131*b*, 131*c*, and 131*d* are again transferred to the surface of the intermediate conveyance belt 135.

In either of the cases, the toner returned to the surface of the intermediate conveyance belt 135 is scraped by the cleaning blade 142. Also, application of the negative voltage to the primary transfer roller 136 and secondary transfer roller 141 is performed with a special sequence (cleaning process) that is different from the print sequence.

(2) Power Supply Apparatus

Figure 2:
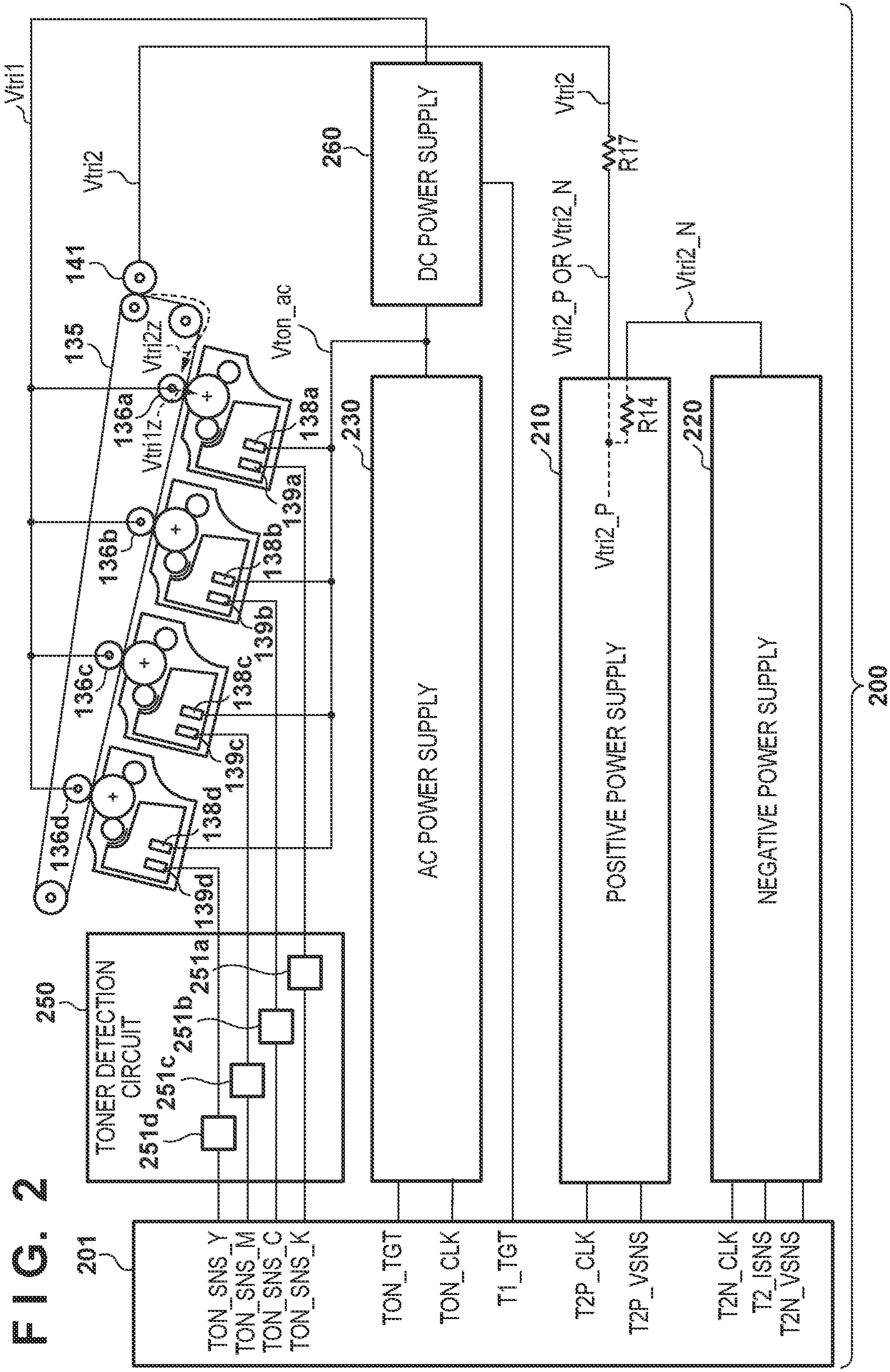
FIG. 2 is a block diagram of a power supply apparatus.

FIG. 2 illustrates a power supply apparatus 200 that supplies power to the image forming apparatus 101. A control unit 201 is a control circuit constituted by a central processing unit (CPU), an application specific integrated circuit (ASIC), or the like. An AC power supply 230 is an AC power supply circuit that generates an AC voltage Vton_ac for detecting information regarding the remaining toner amount. A toner detection circuit 250 includes a capacitance detection circuit 251 that detects the electrostatic capacitance between the electrode plate 138 and the electrode plate 139, generates a detection signal indicating the electrostatic capacitance (remaining toner amount), and outputs the detection signal to a TON_SNS terminal of the control unit 201.

A positive power supply 210 is a power supply circuit that generates a positive voltage Vtri2_P for image formation.

The positive power supply 210 is connected to the secondary transfer roller 141 via an output resistor R17. The positive voltage Vtri2_P output by the positive power supply 210 is subjected to voltage dropping by the output resistor R17, and is reduced to a secondary transfer voltage Vtri2. Accordingly, the secondary transfer voltage Vtri2 is applied to the secondary transfer roller 141.

A negative power supply 220 is a power supply circuit that generates a negative voltage Vtri2_N for cleaning toner. The negative power supply 220 is connected in series to the positive power supply 210, and is connected to the secondary transfer roller 141 via output resistors R14 and R17. For the sake of description, the voltage of each of the positive polarity voltage and negative polarity applied to the secondary transfer roller 141 is denoted as the secondary transfer voltage Vtri2.

A DC power supply 260 is an auxiliary power supply circuit that receives the AC voltage Vton_ac for toner detection, generates a primary transfer voltage Vtri1 by rectifying, smoothing, and stepping up the AC voltage Vton_ac, and applies the primary transfer voltage Vtri1 to the primary transfer roller 136. In Embodiment 1, by applying the secondary transfer voltage Vtri2 to the secondary transfer roller 141, a voltage Vtri2*z* is also applied to the primary transfer roller 136 via the intermediate conveyance belt 135. When the voltage Vtri2*z* is insufficient to the target voltage of a primary transfer voltage Vtri1*z* that is actually applied to the primary transfer roller 136, the primary transfer voltage Vtri1 is also supplied from the DC power supply 260 to the primary transfer roller 136. As described above, the primary transfer voltage Vtri1*z* that is actually applied to the primary transfer roller 136 is formed by the voltage Vtri2*z* and the primary transfer voltage Vtri1.

The control unit 201 includes TON_SNS terminals (TON_SNS_Y terminal, TON_SNS_M terminal, TON_SNS_C terminal, and TON_SNS_K terminal). The TON_SNS_Y terminal is a terminal to which a detection signal indicating the yellow toner remaining amount is input. The TON_SNS_M terminal is a terminal to which a detection signal indicating the magenta toner remaining amount is input. The TON_SNS_C terminal is a terminal to which a detection signal indicating the cyan toner remaining amount is input. The TON_SNS_K terminal is a terminal to which a detection signal indicating the black toner remaining amount is input. The control unit 201 includes a TON_TGT terminal for outputting a setting signal for setting a target voltage to the AC power supply 230, and a TON_CLK terminal for outputting a clock signal for causing the AC power supply 230 to operate. Here, the clock signal is a signal that repeats High and Low, and may also be referred to as a HI/Lo signal. The control unit 201 includes a T1_TGT terminal for outputting a setting voltage to the DC power supply 260 for causing the DC power supply 260 to generate the primary transfer voltage Vtri1. The control unit 201 includes a T2P_VSNS terminal to which a detection voltage proportional to the positive voltage Vtri2_P is input, and a T2P_CLK terminal for outputting a clock signal for causing the positive power supply 210 to operate. The control unit 201 includes a T2N_CLK terminal for outputting a clock signal for causing the negative power supply 220 to operate. Moreover, the control unit 201 includes a T2_ISNS terminal to which a detection voltage proportional to the secondary transfer current is input, and a T2N_VSNS terminal to which a detection voltage proportional to the negative voltage Vtri2_N is input.

(2-1) Secondary Transfer Power Supply

Figure 3:
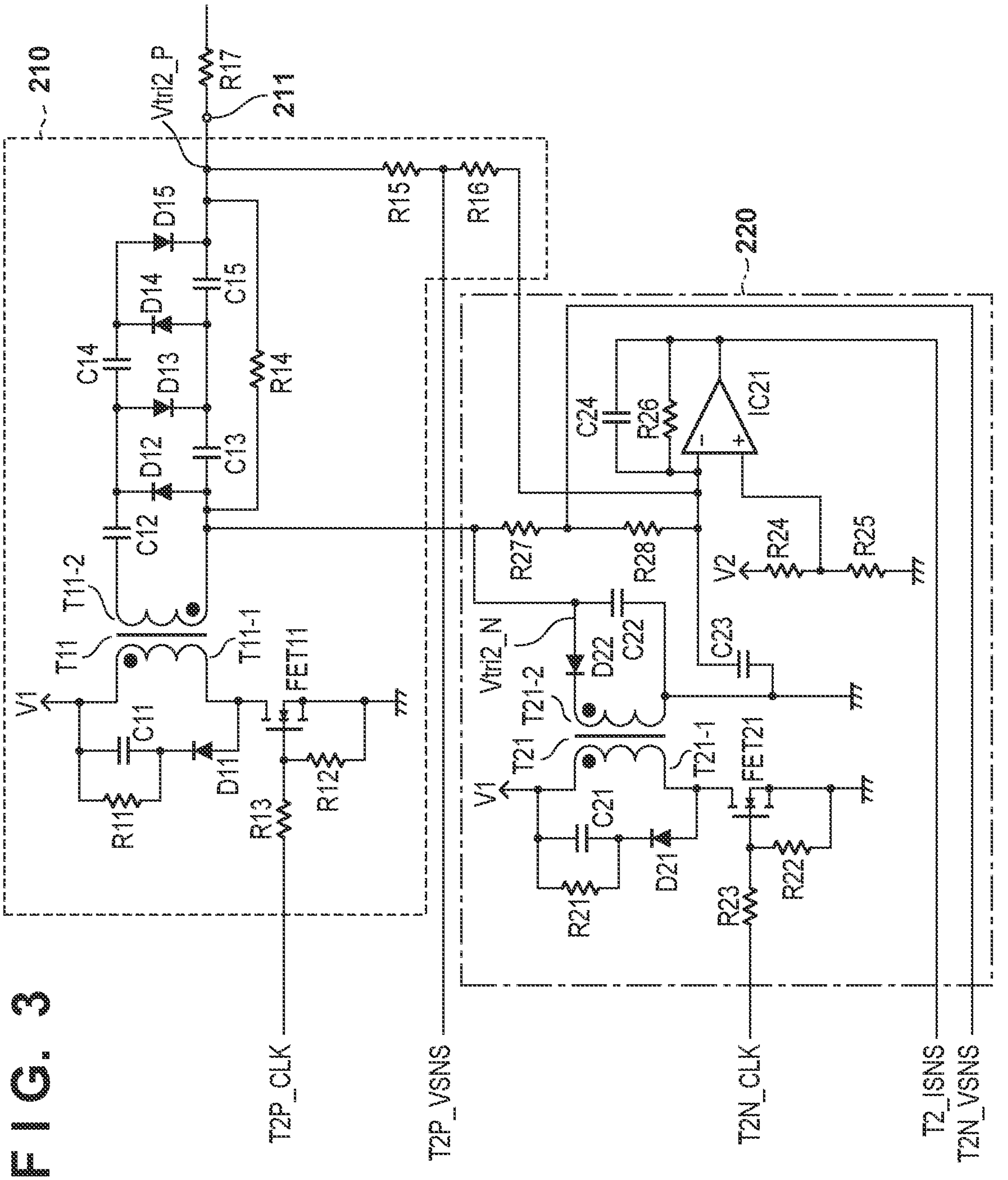
FIG. 3 is a circuit diagram of a positive power supply and a negative power supply.

FIG. 3 is a circuit diagram of the positive power supply 210 that supplies a positive voltage to the secondary transfer roller 141, and a negative power supply 220 that supplies a negative voltage to the secondary transfer roller 141. The positive power supply 210 is formed by subordinate-connecting four rectifying and smoothing circuits formed by diodes D12 to D15 and capacitors C12 to C15.

A transformer T11 includes a primary winding T11-1 and a secondary winding T11-2. The turn ratio between the primary winding T11-1 and the secondary winding T11-2 is 1:N. A power supply voltage V1 is applied to one terminal of the primary winding T11-1. A drain terminal of an FET 11 is connected to the other terminal of the primary winding T11-1. FET is an abbreviation of field effect transistor. A resistor R12 is connected between a gate terminal and a source terminal of the FET 11. The resistor R12 is a noise countermeasure resistor. A resistor R13 is connected between the gate terminal of the FET 11 and the T2P_CLK terminal of the control unit 201. The resistor R13 is a protection resistor of the FET 11. The source terminal of the FET 11 is grounded (connected to the GND wiring). The FET 11 performs a switching operation according to a driving signal input to the source terminal.

A parallel circuit constituted by a capacitor C11 and a resistor R11 is connected to the one terminal of the primary winding T11-1. A cathode of a diode D11 is connected to the parallel circuit. An anode of the diode D11 is connected to the other terminal of the primary winding T11-1.

The four-stage rectifying and smoothing circuit constituted by the diodes D12, D13, D14, and D15 and the capacitors C12, C13, C14, and C15 is connected between two terminals of the secondary winding T11-2. Each stage of the rectifying and smoothing circuit is also function as a stepping up circuit. In a first-stage rectifying and smoothing circuit, an anode of the diode D12 is connected to one terminal of the secondary winding T11-2 of the transformer T11. A cathode of the diode D12 is connected to one terminal of the capacitor C12. The other terminal of the capacitor C12 is connected to the other terminal of the secondary winding T11-2.

In a second-stage rectifying and smoothing circuit, an anode of the diode D13 is connected to the one terminal of the capacitor C12. A cathode or the diode D13 is connected to one terminal of the capacitor C13. The other terminal of the capacitor C13 is connected to the one terminal of the secondary winding T11-2.

In a third-stage rectifying and smoothing circuit, an anode of the diode D14 is connected to the one terminal of the capacitor C13. A cathode of the diode D14 is connected to one terminal of the capacitor C14. The other terminal of the capacitor C14 is connected to the one terminal of the capacitor C12.

In a fourth-stage rectifying and smoothing circuit, an anode of the diode D15 is connected to the one terminal of the capacitor C14. A cathode of the diode D15 is connected to one terminal of the capacitor C15. The other terminal of the capacitor C15 is connected to the one terminal of the capacitor C13.

Here, the one terminal of the capacitor C15 is connected to the secondary transfer roller 141 via the output terminal 211. The one terminal of the capacitor C15 is also connected to an inverting input terminal of an operational amplifier IC21 via a voltage-dividing circuit constituted by resistors R15 and R16. The connection point between the resistor R15 and resistor R16 is connected to the T2P_VSNS terminal of the control unit 201. That is, the output voltage transmitted to the output terminal 211 is voltage-divided by the resistors R15 and R16 so as to generate a detection voltage that is proportional to the output voltage, and the detection voltage is fed back to the control unit 201.

The positive power supply 210 operates as follows. When a High-state signal is output from the T2P_CLK terminal of the control unit 201, the FET 11 is turned on, and the drain voltage thereof decreases approximately to the GND potential. Accordingly, a forward voltage is applied across the primary winding T11-1 of the transformer T11, and an exciting current flows. At the same time, a forward voltage N times the forward voltage on the primary side is generated across the secondary winding T11-2, and the forward voltage is rectified and smoothed by the diode D12 and the capacitor C12.

Next, when the voltage output from the T2P_CLK terminal changes to a Lo state, the FET 11 is turned off, and a flyback voltage is generated across the primary winding T11-1. At the same time, a flyback voltage N times the flyback voltage on the primary side is generated across the secondary winding T11-2. A voltage that is a sum of the flyback voltage generated across the secondary winding T11-2 and a charged voltage of the capacitor C12 is rectified and smoothed by the diode D13 and the capacitor C13. Here, the capacitor C11, the resistor R11, and the diode D11 function as a snubber for absorbing a surge voltage that is generated by a leakage inductance of the primary winding T11-1.

Next, when the voltage output from the T2P_CLK terminal again changes to a Hi state, a forward voltage is generated across the secondary winding T11-2. A summed voltage is obtained by summing the forward voltage generated across the secondary winding T11-2 and a charged voltage of the capacitor C13. The summed voltage is rectified by the diode D14, and is smoothed by the capacitors C14 and C12.

Next, the voltage output from the T2P_CLK terminal again changes to a Lo state, a flyback voltage is generated across the secondary winding T11-2. A summed voltage obtained by summing the flyback voltage generated across the secondary winding T11-2 and charged voltages of the capacitors C12 and C14 is rectified by the diode D15 and is smoothed by series-connected capacitors of capacitors C15 and C13. The voltage generated at the one terminal of the capacitor C15 is a positive voltage Vtri2_P.

Here, a voltage (detection voltage) obtained by dividing a voltage obtained by summing the positive voltage Vtri2_P and the voltage at the inverting input terminal of the operational amplifier IC21 by the resistors R15 and R16 is input to the T2P_VSNS terminal.

The voltage at the inverting input terminal of the operational amplifier IC21 is the same as the voltage (voltage generated by dividing the power supply voltage V2 by the resistors R24 and R25) at the non-inverting input terminal, which is in a relationship of virtual short.

In the positive power supply 210, as a result of the Hi/Lo signal being repeatedly output from the T2P_CLK terminal, the positive voltage Vtri2_Pis generated. The value of the positive voltage Vtri2_P changes according to the Hi/Lo signal from the T2P_CLK terminal. The control unit 201 controls the Hi/Lo signal output from the T2P_CLK terminal such that the value of voltage input to the T2P_VSNS terminal is a desired value. In the present embodiment, the time length of the Hi signal is controlled in a state of fixing the time period of the Lo signal output from the T2P_CLK terminal. However, this is merely an example of the control method. As another control method, there is a method of controlling the duty ratio of the Hi signal in a state of fixing the repeating period of the Hi signal and the Lo signal, or the like. Such a control signal or driving signal may also be referred to as a PWM signal. PWM is an abbreviation of pulse width modulation.

The negative power supply 220 includes a single stage rectifying and smoothing circuit constituted by a diode D22 and a capacitor C22. A transformer T21 includes a primary winding T21-1 and a secondary winding T21-2. The turn ratio between the primary winding T21-1 and the secondary winding T21-2 is 1:M. The power supply voltage V1 is applied to one terminal of the primary winding T21-1. A drain terminal of an FET 21 is connected to the other terminal of the primary winding T21-1. A noise countermeasure resistor R22 is connected between a gate terminal and a source terminal of the FET 21. Also, a protection resistor R23 is connected between the source terminal and the T2N_CLK terminal of the control unit 201. The source terminal of the FET 21 is connected to GND wiring. A parallel circuit constituted by a capacitor C21 and a resistor R21 and a diode D21 connected in series to the parallel circuit are connected between two terminals of the primary winding T21-1.

A diode D22 and a capacitor C22 are connected between two terminals of the secondary winding T21-2. A cathode of the diode D22 is connected to one terminal of the secondary winding T21-2 of the transformer T21. An anode of the diode D22 is connected to one terminal of the capacitor C22. The other terminal of the capacitor C22 is connected to the other terminal of the secondary winding T21-2, and is connected to GND wiring.

The one terminal of the capacitor C22 is also connected to a cathode of a diode D23. An anode of the diode D23 is connected to the one terminal of the secondary winding T11-2 of the transformer T11 of the positive power supply 210. The anode of the diode D23 is also connected to the inverting input terminal of the operational amplifier IC21 via a series connection circuit of a resistor R27 and a resistor R28. As shown by FIG. 3, the diode D23 may be omitted. The connection point between the resistor R27 and resistor R28 is connected to the T2N_VSNS terminal of the control unit 201. A detection voltage is obtained by dividing the negative voltage Vtri2_N generated by the negative power supply 220 with the resistor R27 and resistor R28, and is fed back to the T2N_VSNS terminal.

The inverting input terminal of the operational amplifier IC21 is connected to GND wiring via the capacitor C23. A resistor R26 and a capacitor C24 are connected in parallel between the inverting input terminal of the operational amplifier IC21 and an output terminal of the operational amplifier IC21. The output terminal of the operational amplifier IC21 is connected to the T2_ISNS terminal of the control unit 201. The connection point between the resistor R24 and the resistor R25 is connected to the non-inverting input terminal of the operational amplifier IC21. The resistors R24 and R25 divide the power supply voltage V2 and apply the divided voltage to the non-inverting input terminal of the operational amplifier IC21. The operational amplifier IC21, the resistor R26, and the capacitor C24 form a current detection circuit that detects the current of the secondary transfer roller 141.

The negative power supply 220 operates as follows. When a High-state signal is output from the T2N_CLK terminal of the control unit 201, the FET 21 is turned on, and the drain potential thereof decreases approximately to the GND potential. Accordingly, a voltage is applied across the primary winding T21-1 of the transformer T21, and an exciting current flows. At the same time, a forward voltage M times the forward voltage on the primary side is generated across the secondary winding T21-2.

Next, when the voltage output from the T2N_CLK terminal changes to a Lo state, the FET 21 is turned off, and a flyback voltage is generated across the primary winding T21-1. At the same time, a flyback voltage M times the flyback voltage on the primary side is generated across the secondary winding T21-2. This flyback voltage is rectified and smoothed by the diode D22 and capacitor C22. The capacitor C21, the resistor R21, and the diode D21 function as a snubber for absorbing a surge voltage that is generated by a leakage inductance of the primary winding T21-1. The voltage at the one terminal of the capacitor C22 is a negative voltage Vtri2_N, which is a negative secondary transfer voltage.

The negative voltage Vtri2_N is applied to the other terminal of the secondary winding T11-2 of the transformer T11 via the diode D23. Here, a voltage obtained by dividing the voltage at the anode of the diode D23 and the voltage at the inverting input terminal of the operational amplifier IC21 by the resistors R27 and R28 is input to the T2N_VSNS terminal.

In the negative power supply 220, as a result of the Hi/Lo signal being repeatedly output from the T2N_CLK terminal, the negative voltage Vtri2_N is generated. The value of the negative voltage Vtri2_N changes according to the Hi/Lo signal from the T2N_CLK terminal. The control unit 201 controls the Hi/Lo signal output from the T2N_CLK terminal such that the value of voltage input to the T2N_VSNS terminal is a desired value. In the present embodiment, the time period of the Hi signal is controlled in a state of fixing the time period of the Lo signal output from the T2N_CLK terminal.

Incidentally, the operational amplifier IC21 is provided to detect the value of current supplied to the secondary transfer roller 141. A current supplied to the secondary transfer roller 141 from the one terminal of the capacitor C15 flows to the frame (=GND) of the image forming apparatus 101, and is returned to the other terminal of the capacitor C13 from the output terminal of the operational amplifier IC21 through the resistor R26, the resistor R28, and the resistor R27. That is, a voltage obtained by converting the current flowing through the resistor R26 is input to the T2_ISNS terminal.

As shown in FIG. 3, the positive power supply 210 and the negative power supply 220 are in a relationship of series connection to each other. The control unit 201 generates the positive voltage Vtri2_P, which is a positive primary transfer voltage, by causing the positive power supply 210 to operate, and supplies the positive voltage Vtri2_P to the secondary transfer roller 141. Also, the control unit 201 generates the negative voltage Vtri2_N by causing the negative power supply 220 to operate, and supplies the negative voltage Vtri2_N to the secondary transfer roller 141. As FIG. 3 shows, the resistor R14 and resistor R17 are interposed between the output terminal 221 and the secondary transfer roller 141. Therefore, the negative voltage Vtri2_N is divided by a combined resistance of the resistors R14 and R17 and the resistance of the secondary transfer roller 141, and the divided voltage is applied to the secondary transfer roller 141. The negative voltage Vtri2_N is a voltage for toner cleaning, and is applied in periods of prior rotation and subsequent rotation, and in an inter-sheet period. The prior rotation refers to a rotation of the intermediate conveyance belt 135 before a toner image is formed. The subsequent rotation refers to a rotation of the intermediate conveyance belt 135 after a toner image is formed. The inter-sheet period refers to a period between a timing at which a toner image is formed on a preceding sheet P and a timing at which a toner image is formed on a subsequent sheet P.

(2-2) Toner Detection Circuit

The toner detection circuit 250 detects information regarding the remaining amount of toner filled in each of the toner containers 134*a*, 134*b*, 134*c*, and 134*d*. The permittivity of toner is larger than the permittivity of air. Therefore, the electrostatic capacitance between the electrode plate 138 and the electrode plate 139 changes according to the amount of toner that is present between the electrode plate 138 and the electrode plate 139. As the amount of toner increases, the electrostatic capacitance increases. As the amount of toner decreases, the electrostatic capacitance decreases. Using this phenomenon, the control unit 201 computes the remaining amount of toner stored in the toner container 134 based on the electrostatic capacitance detected by the toner detection circuit 250. When an AC voltage Vton_ac is applied to the electrode plate 138 on one side, an AC current flows in the electrode plate 139 on the other side. The capacitance detection circuit 251 generates a detection signal indicating the electrostatic capacitance by detecting this AC current.

Figure 4:
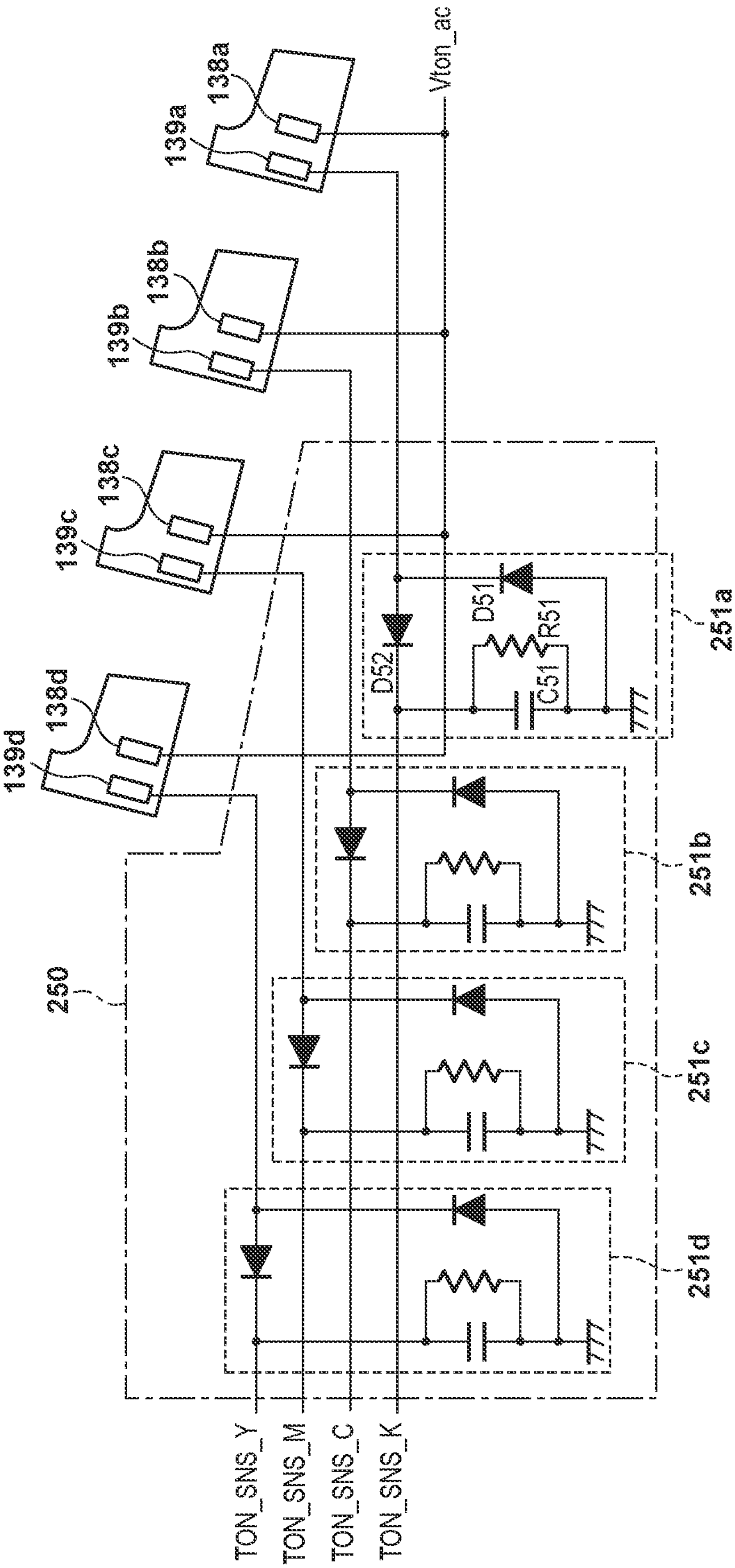
FIG. 4 is a circuit diagram of a toner detection circuit.

FIG. 4 shows a circuit diagram of the capacitance detection circuit 251. The capacitance detection circuits 251*a* to 251*d* each include the same peak hold circuit. An anode of a diode D52 is connected to the electrode plate 139. A cathode of the diode D52 is connected to one end of a capacitor C51. The other end of the capacitor C51 is connected to GND wiring. Accordingly, when the value of the AC current is in a positive range, the capacitor C51 is charged with the AC current through the diode D52.

On the other hand, a cathode of a diode D51 is connected to the electrode plate 139. An anode of the diode D51 is connected to the other end of the capacitor C51. A resistor R51 is connected in parallel to the capacitor C51. The diode D51 and resistor R51 are for discharging and resetting the capacitor C51. One end of the capacitor C51 is connected to the TON_SNS terminal. That is, a peak voltage of the AC voltage generated between the electrode plate 138 and electrode plate 139 is applied to the TON_SNS terminal. The control unit 201 obtains a peak voltage value by performing analog to digital conversion on the peak voltage, and computes the electrostatic capacitance from the peak voltage value.

Figure 5:
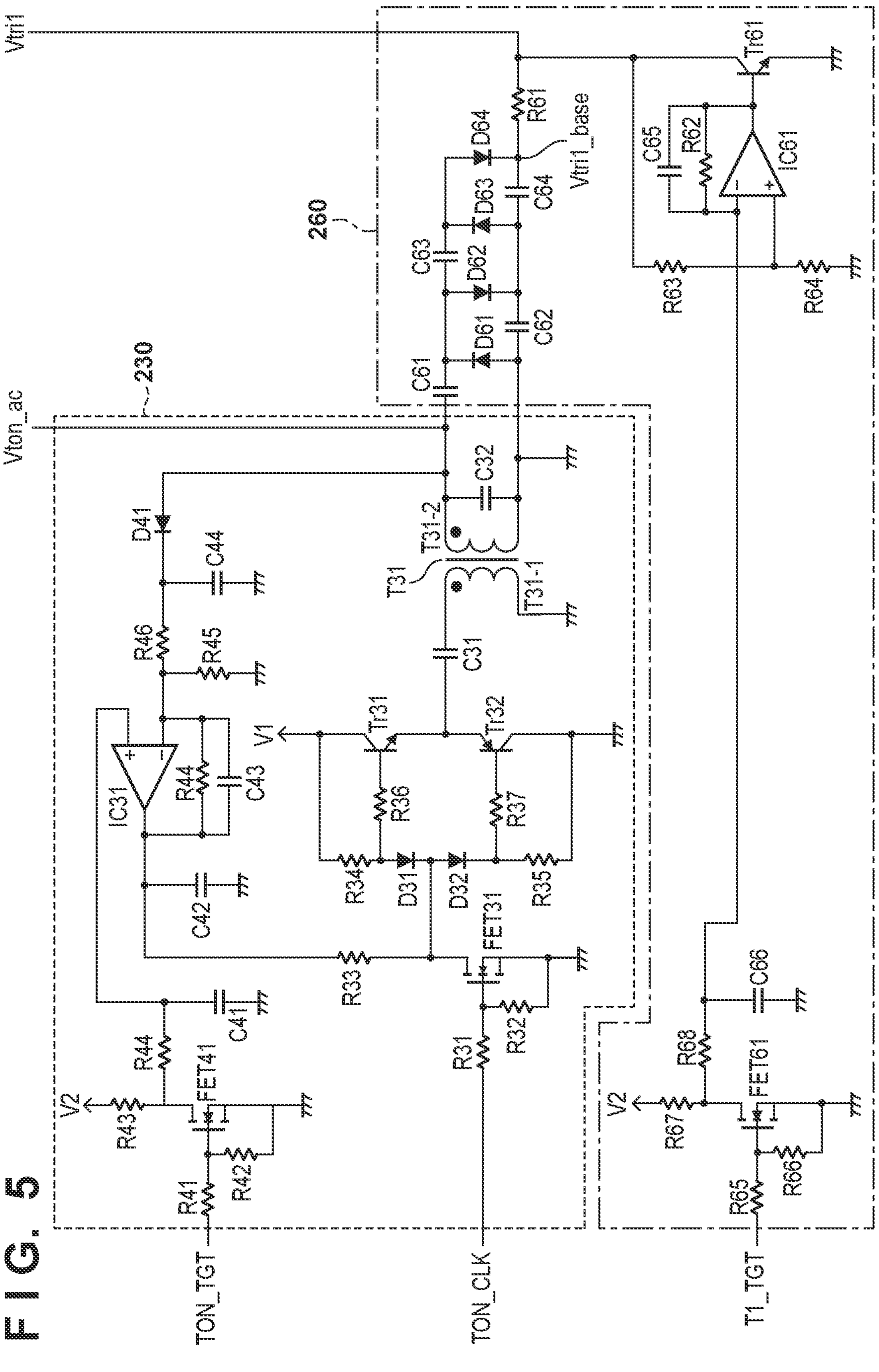
FIG. 5 is a circuit diagram of an AC power supply and an auxiliary power supply (primary transfer power supply).

(2-3) AC Power Supply and DC Power Supply (2-3-1) Circuit Configuration of AC Power Supply FIG. 5 is a circuit diagram of the AC power supply 230 and the DC power supply 260. The AC power supply 230 includes a transformer T31. The transformer T31 includes a primary winding T31-1 and a secondary winding T31-2. The turn ratio between the primary winding T31-1 and secondary winding T31-2 is L. One terminal of a capacitor C31 is connected to one terminal of the primary winding T31-1. The other terminal of the primary winding T31-1 is connected to GND wiring. The other terminal of the capacitor C31 is connected to an emitter terminal of an NPN-type transistor Tr31 and an emitter terminal of a PNP-type transistor Tr32. The power supply voltage V1 is applied to a collector terminal of the transistor Tr31. A collector terminal of the transistor Tr32 is connected to GND wiring. A resistor R34, a diode D31, a diode D32, and a resistor R35 are connected in series between the power supply voltage V1 and GND wiring. A base terminal of the transistor Tr31 is connected to a connection point between the resistor R34 and an anode of the diode D31 via a resistor R36. A base terminal of the transistor Tr32 is connected to a connection point between the resistor R35 and a cathode of the diode D32 via a resistor R37. The resistors R36 and R37 are protection resistors. The connection point between the diode D31 and diode D32 is connected to a drain terminal of a FET 31, and is also connected to an output terminal of an operational amplifier IC31 via a resistor R33. A gate terminal of the FET 31 is connected to the TON_CLK terminal of the control unit 201 via a resistor R31. A resistor R32 serving as a measure against noise is connected between the gate terminal and a source terminal of the FET 31.

A capacitor C32 is connected between the two terminals of the secondary winding T31-2 of the transformer T31. One terminal of the secondary winding T31-2 is connected to the electrode plates 138*a*, 138*b*, 138*c*, and 138*d* on one side. The other terminal of the secondary winding T31-2 is connected to GND wiring.

The one terminal of the secondary winding T31-2 is also connected to an anode terminal of a diode D41. A cathode terminal of the diode D41 is connected to GND wiring via a capacitor C44. The cathode terminal of the diode D41 is also connected to an inverting input terminal of the operational amplifier IC31 via a resistor R46. The inverting input terminal of the operational amplifier IC31 is connected to GND wiring via a resistor R45. Moreover, the inverting input terminal is connected to an output terminal of the operational amplifier IC31 via a parallel connection circuit of a resistor R44 and a capacitor C43. A non-inverting input terminal of the operational amplifier IC31 is connected to GND wiring via a capacitor C41. Also, the non-inverting input terminal is connected to a drain terminal of an FET 41 via the resistor R44. The power supply voltage V2 is applied to the drain terminal of the FET 41 via a resistor R43. A gate terminal of the FET 41 is connected to the TON_TGT terminal of the control unit 201 via a resistor R41. A resistor R42 is connected between the gate terminal and a source terminal of the FET 41.

(2-3-2) Operations of AC Power Supply

When a High-state signal is output from the TON_CLK terminal of the control unit 201, the AC power supply 230 does not output the AC voltage Vton_ac. In this state, the FET 31 is kept on, and the drain voltage of the FET 31 is approximately the same as the ground potential. Accordingly, a current flows from a terminal at the power supply voltage V1 to GND wiring via the resistor R34, diode D31, and FET 31, and the voltage at the anode terminal of the diode D31 becomes a forward voltage Vf of the diode D31. Here, when the forward voltage Vf of the diode D31 is the same as or less than the forward voltage Vf between the base and emitter of the transistor Tr31, a current does not flow into the base terminal of the transistor Tr31. Therefore, the transistor Tr31 is turned off. When the forward voltage Vf of the diode D31 is larger than the forward voltage Vf between the base and emitter of the transistor Tr31, the transistor Tr31 is turned on until the voltage at the base terminal of the transistor Tr31 becomes the same as the forward voltage Vf of the diode D31. In either of the cases, the potential difference across the capacitor C31 becomes approximately zero. Also, the transistor Tr32 is turned off.

When a Lo signal is output from the TON_CLK terminal of the control unit 201, the FET 31 is turned off, and the voltage at the drain terminal of the FET 31 increases. As a result, a current flows into the base terminal of the transistor Tr31 through the resistors R34 and R36 from a terminal at the power supply voltage V1. Accordingly, the transistor Tr31 is turned on, and a current flows to the capacitor C31 and primary winding T31-1 via the transistor Tr31 from the terminal at the power supply voltage V1. The capacitor C31 is charged with this current, and a voltage is generated across the capacitor C31. Here, a voltage is generated between one terminal and the other terminal of the primary winding T31-1, and the one terminal that is connected to the capacitor C31 is in a positive polarity.

Thereafter, a Hi signal is again output from the TON_CLK terminal of the control unit 201, the FET 31 is turned on, and the transistor Tr31 is turned off. At this moment, the capacitor C31 is charged, and therefore the charges in the capacitor C31, which is charged, flows from the emitter terminal to the base terminal of the transistor Tr32, and the transistor Tr32 is turned on. Accordingly, a discharging current flows in a route starting from the capacitor C31 and returning to the capacitor C31 through the transistor Tr32, GND wiring, and the primary winding T31. At this moment, a voltage is generated between the one terminal and the other terminal of the primary winding T31-1, and the one terminal connected to the capacitor C31 is in a negative polarity.

As describe above, as a result of the Hi/Lo signal (clock signal) being repeatedly output from the TON_CLK terminal of the control unit 201, an AC current is generated in the capacitor C31 and primary winding T31-1, and an AC voltage is generated between the two terminals of the primary winding T31-1. Accordingly, an AC voltage obtained by multiplying the AC voltage generated between the two terminals of the primary winding T31-1 by the turn ratio Lis generated in the secondary winding T31-2. The AC voltage Vton_ac generated in the secondary winding T31-2 is supplied to the electrode plates 138*a*, 138*b*, 138*c*, and 138*d* on one side. Note that the voltage across the capacitor C31 stabilizes at a voltage approximately half the drain voltage of the FET 31 when the FET 31 is turned off. Also, the peak to peak value of the AC voltage generated between the terminals of the primary winding T31-1 is approximately the same as the drain voltage of the FET 31 when the FET 31 is turned off.

The AC voltage Vton_ac is peak-held by the diode D41 and capacitor C44. The peak-held voltage is divided by the resistor R46 and resistor R45, and the divided voltage is input to the inverting input terminal of the operational amplifier IC31. The FET 41 is turned on and off by the Hi/Lo signal output from the TON_TGT terminal of the control unit 201, and with this, a voltage obtained by being rectified and smoothed by the resistor R44 and capacitor C41 is input to the non-inverting input terminal of the operational amplifier IC31. When the voltage at the inverting input terminal is smaller than the voltage at the non-inverting input terminal, the operational amplifier IC31 increases the voltage at the output terminal. Accordingly, the AC voltage between the two terminals of the primary winding T31-1 and the AC voltage Vton_ac increase. When the voltage at the inverting input terminal is larger than the voltage at the non-inverting input terminal, the operational amplifier IC31 decreases the voltage at the output terminal. Accordingly, the AC voltage between the two terminals of the primary winding T31-1 and the AC voltage Vton_ac decrease. As a result of such a feedback operation, the voltage at the inverting input terminal approaches the voltage at the non-inverting input terminal.

As described above, as a result of the control unit 201 controlling the Hi/Lo signal output from the TON_TGT terminal, the voltage value of the AC voltage Vton_ac supplied to the electrode plates 138*a*, 138*b*, 138*c*, and 138*d* on one side is controlled. In Embodiment 1, the frequency of the Hi/Lo signal output from the TON_TGT terminal is fixed, and the ratio of time during which a Hi signal is output per one period (duty ratio) is controlled.

Figure 6A:
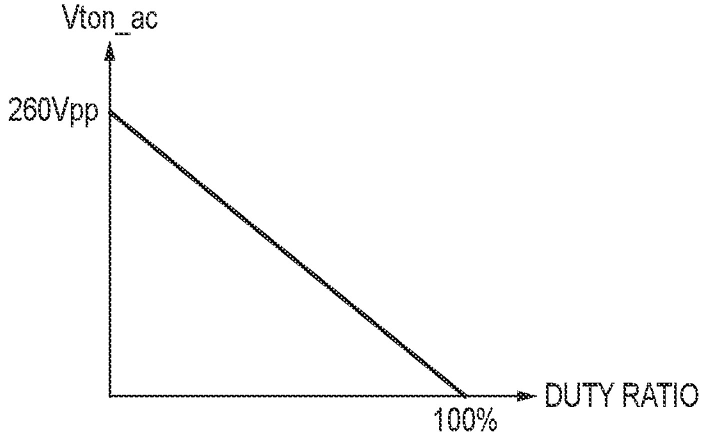
FIGS. 6A and 6B are graphs illustrating a relationship between a duty ratio and output voltages.

FIG. 6A is a graph illustrating a relationship between the duty ratio of a signal output from the TON_TGT terminal and the AC voltage Vton_ac. When the duty ratio is 0%, the AC voltage Vton_ac takes a largest value (e.g., 260 Vpp). When the duty ratio is 100%, the AC voltage Vton_ac takes a smallest value (e.g., 0 Vpp).

(2-3-3) Circuit Configuration of DC Power Supply

The primary transfer voltage Vtri1, which is in a positive polarity, that is generated by the DC power supply 260 is applied to the primary transfer rollers 136*a*, 136*b*, 136*c*, and 136*d*. In Embodiment 1, the DC power supply 260 generates a positive voltage by stepping up the AC voltage Vton_ac by the four-stage rectifying and smoothing circuit (stepping-up circuit), as shown in FIG. 5. The number of stages of the rectifying and smoothing circuit may be determined based on the voltage value of the needed primary transfer voltage Vtri1, and the voltage value of the AC voltage Vton_ac that is input.

According to FIG. 5, the multi-stage rectifying and smoothing circuit is connected between the two terminals of the secondary winding T31-2 of the transformer T31. Such a multi-stage rectifying and smoothing circuit is referred to as a Cockcroft-Walton Circuit. The first-stage rectifying and smoothing circuit is constituted by a capacitor C61 and a diode D61. The second-stage rectifying and smoothing circuit is constituted by a capacitor C62 and a diode D62. The third-stage rectifying and smoothing circuit is constituted by a capacitor C63 and a diode D63. The fourth-stage rectifying and smoothing circuit is constituted by a capacitor C64 and a diode D64.

The connection point between the capacitor C64 and a cathode of the diode D64 is connected to the primary transfer rollers 136*a*, 136*b*, 136*c*, and 136*d*, and a collector terminal of a transistor Tr61 via a resistor R61. An emitter terminal of the transistor Tr61 is connected to GND wiring. A base terminal of the transistor Tr61 is connected to an output terminal of an operational amplifier IC61. The collector terminal of the transistor Tr61 is connected to GND wiring via resistors R63 and R64. The connection point between the resistor R63 and resistor R64 is connected to a non-inverting input terminal of the operational amplifier IC61. A parallel circuit constituted by a resistor R62 and a capacitor C65 is connected between the output terminal and an inverting input terminal of the operational amplifier IC61. One end of a capacitor C66 and one end of a resistor R68 are connected to the inverting input terminal of the operational amplifier IC61. The other end of the capacitor C66 is connected to GND wiring. The other end of the resistor R68 is connected to a drain terminal of an FET 61. The power supply voltage V2 is applied to a drain terminal of the FET 61 via the resistor R67. A gate terminal of the FET 61 is connected to the T1 TGN terminal of the control unit 201 via a resistor R65. A resistor R66 is connected between the gate terminal and a source terminal of the FET 61.

(2-3-4) Operations of Auxiliary Power Supply

A base voltage Vtri1_base is generated by the AC voltage Vton_ac being stepped up by the four-stage rectifying and smoothing circuit. The base voltage Vtri1_base is about four times the peak-to-peak voltage of the AC voltage Vtri_ac. The voltage of the base voltage Vtri1_base decreases due to a voltage drop in the resistor R61, and becomes the primary transfer voltage Vtri1. The current flowing through the resistor R61 is a sum of currents flowing in the primary transfer rollers 136*a*, 136*b*, 136*c*, and 136*d*, and currents flowing through the transistor Tr61 and resistor R63. In order to control the primary transfer voltage Vtri1 to a predetermined value, the current flowing through the resistor R61 needs to be controlled.

When the control unit 201 outputs the Hi/Lo signal from the T1_TGT terminal, the FET 61 is turned on and off. Accordingly, a voltage subjected to rectification and smoothing by the resistor R68 and the capacitor C66 is input to an inverting input terminal of the operational amplifier IC61. The primary transfer voltage Vtri1 is divided by the resistor R63 and resistor R64. This divided voltage is a voltage at the non-inverting input terminal of the operational amplifier IC61. When the divided voltage is larger than the voltage at the inverting input terminal (setting voltage corresponding to a target voltage), the voltage at the output terminal of the operational amplifier IC61 increases, and the current flowing through the transistor Tr61 also increases. The current flowing through the resistor R61 also increases. As a result, the amount of voltage drop occurring in the resistor R61 that the base voltage Vtri1_base suffers increases, and the primary transfer voltage Vtri1 decreases. In contrast, when the voltage at the non-inverting input terminal is smaller than the voltage at the inverting input terminal, feedback operates such that the primary transfer voltage Vtri increases. Accordingly, the primary transfer voltage Vtri1 is kept at a target voltage.

As described above, the control unit 201 controls the primary transfer voltage Vtri1 to be supplied to the primary transfer rollers 136*a*, 136*b*, 136*c*, and 136*d* by controlling the Hi/Lo signal output from the T1_TGT terminal. In Embodiment 1, the frequency of the Hi/Lo signal output from the T1_TGT terminal is fixed, and the ratio of time during which a Hi signal is output (duty ratio) is controlled.

Figure 6B:
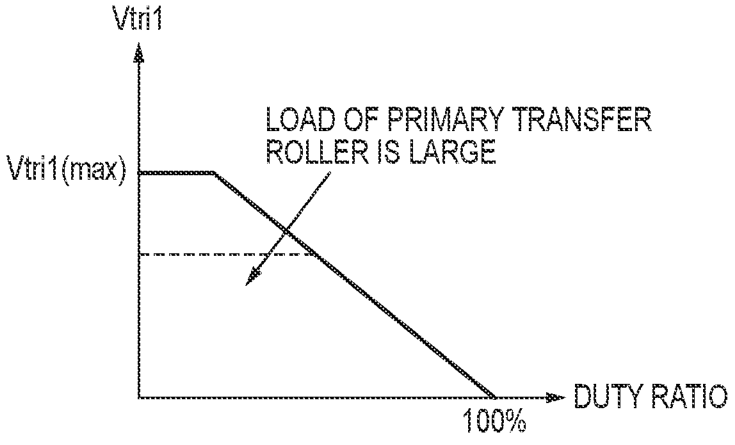

FIG. 6B is a graph illustrating a relationship between the duty ratio of a signal output from the T1_TGT terminal and the primary transfer voltage Vtri1. The primary transfer voltage Vtri1 when the duty ratio is 100% is 0 V. As the duty ratio decreases, the primary transfer voltage Vtri1 increases. A control region is present in which the primary transfer voltage Vtri1 does not change even if the duty ratio decreases. The primary transfer voltage Vtri1 at this moment is defined as a voltage Vtri1 (*max*). The voltage Vtri1 (*max*) depends on the load of the primary transfer roller 136. As the load of the primary transfer roller 136 increases, the voltage Vtri1 (*max*) decreases.

Incidentally, the inner surface layer of the intermediate conveyance belt 135 in Embodiment 1 has a conductivity. When the positive voltage Vtri2_Pis applied to the secondary transfer roller 141, currents flow in the primary transfer rollers 136*a*, 136*b*, 136*c*, and 136*d*, and the DC power supply 260 from the secondary transfer roller 141 through the intermediate conveyance belt 135. Accordingly, voltages are applied to the primary transfer rollers 136*a*, 136*b*, 136*c*, and 136*d*. That is, the positive voltage Vtri2_P also functions as an auxiliary power supply of the primary transfer voltage Vtri1.

In Embodiment 1, the DC power supply 260 does not include a dedicated AC power supply, and uses the AC power supply 230 for the toner detection circuit 250. That is, the AC power supply 230 is shared by the toner detection circuit 250 and the DC power supply 260 that generates the primary transfer voltage Vtri1. Accordingly, the cost and arrangement space of the power supply circuit that generates the primary transfer voltage Vtri1 can be reduced. That is, the circuit scale of the power supply circuit is reduced, and the size of the image forming apparatus 101 can also be reduced.

Embodiment 2

In Embodiment 2, the operation of the AC power supply 230 changes according to whether or not the positive power supply 210 generates the positive voltage Vtri2_P. The other points in Embodiment 2 are in common with Embodiment 1. Therefore, the description in Embodiment 1 is referred to as the description of points in common with Embodiment 1.

Figure 7A:
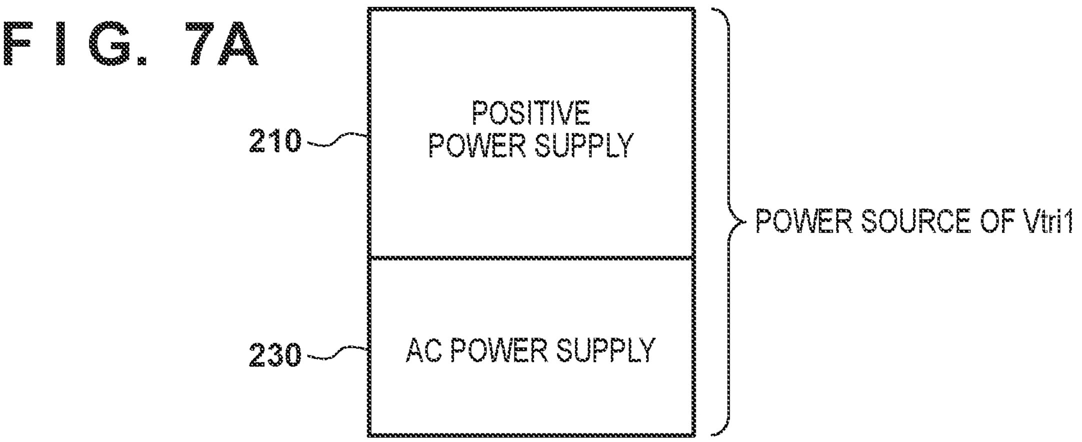
FIGS. 7A to 7C are diagrams for describing a power source for generating a primary transfer voltage.

The positive voltage Vtri2_P also functions as an auxiliary power supply of the primary transfer voltage Vtri1*z*. That is, as FIG. 7A shows, the power source of the primary transfer voltage Vtri1*z* is constituted by AC power supply 230 and the positive power supply 210.

Figure 7B:
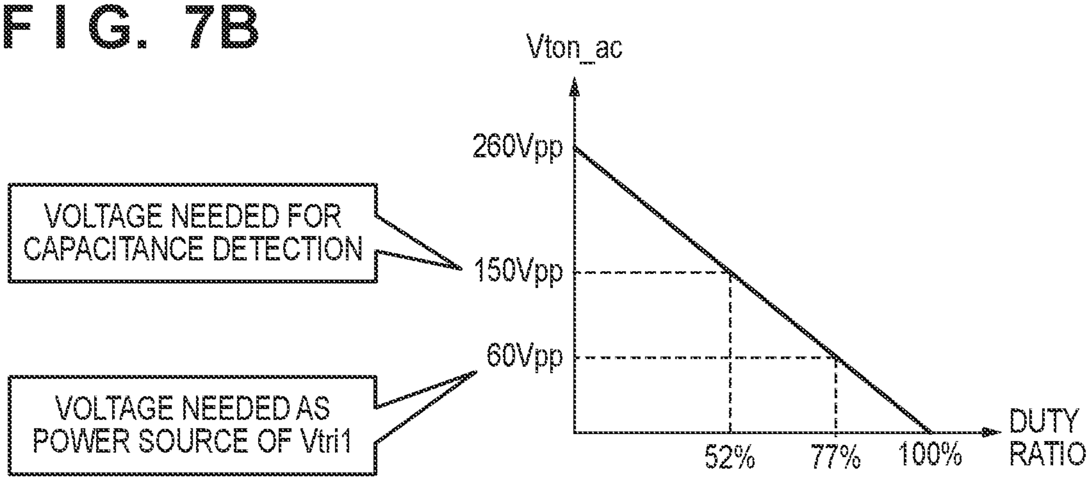

FIG. 7B is a graph illustrating a relationship between the duty ratio and the AC voltage Vton_ac.

When the power supply from the positive power supply 210 is taken into consideration, the AC voltage Vton_ac needed as the power source of the primary transfer voltage Vtri1*z* is 60 Vpp, for example. This corresponds to the duty ratio of 77% of the signal from the TON_TGT terminal. On the other hand, the AC voltage Vton_ac needed for electrostatic capacitance detection is 150 Vpp, for example. This corresponds to the duty ratio of 52% of the signal from the TON_TGT terminal. Therefore, the AC voltage Vton_ac needed as the power source of the primary transfer voltage Vtri1*z* is lower than the AC voltage Vton_ac needed for electrostatic capacitance detection. Accordingly, the AC power supply 230 need only generate 60 Vpp of the AC voltage Vton_ac at timings at which the control unit 201 is not performing electrostatic capacitance detection.

Figure 8A:
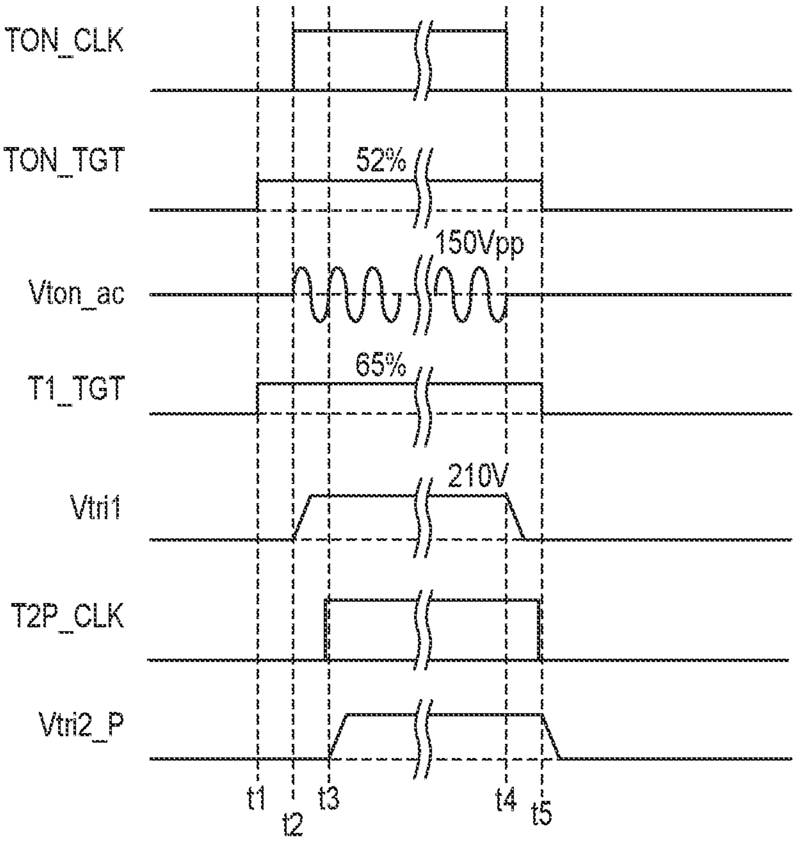
FIGS. 8A and 8B are diagrams illustrating changes over time of various types of signals and the output voltages.
Figure 8B:
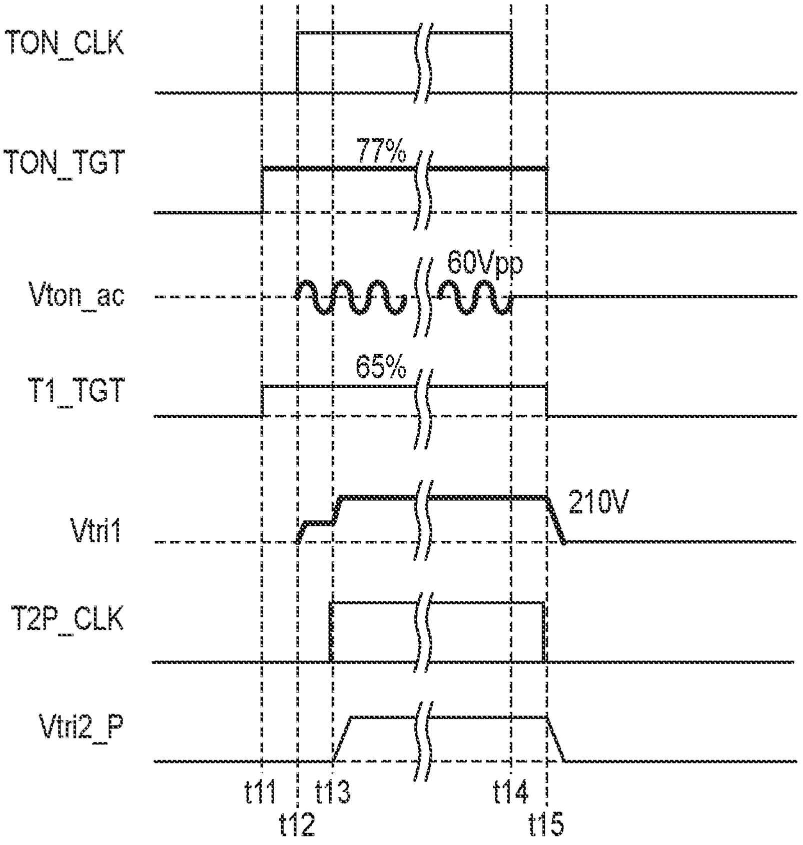

(3-1) Changes Over Time of Signals and Voltages when Electrostatic Capacitance Detection is Executed FIGS. 8A and 8B illustrate changes over time of various signals and output voltages that relate to the positive power supply 210, the AC power supply 230, and the DC power supply 260, when image formation is started. In particular, FIG. 8A shows changes over time when the electrostatic capacitance detection is executed.

Figure 7C:
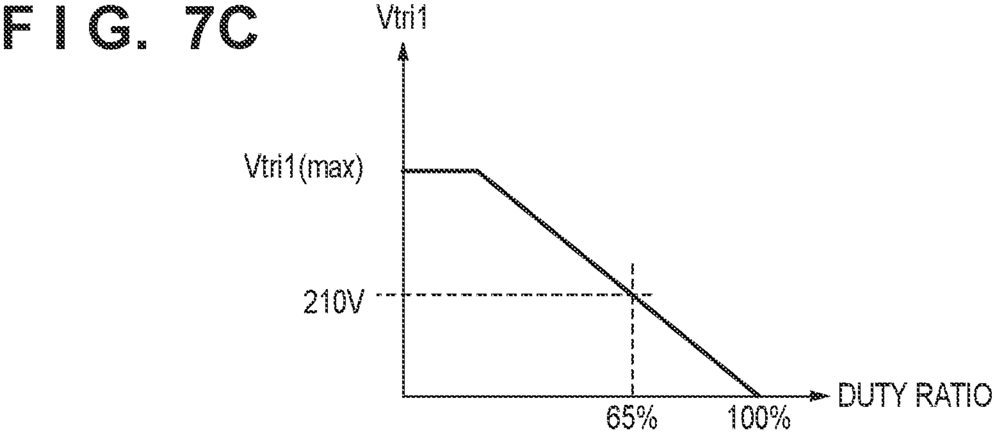

At time t1, the control unit 201 performs setting regarding the TON_TGT terminal and T1_TGT terminal. The duty ratio of the signal to be output from the TON_TGT terminal is 52%. This corresponds to 150 Vpp of the AC voltage Vton_ac. Also, as FIG. 7C shows, the duty ratio of the signal to be output from the T1_TGT terminal is set to 65% in order to set the primary transfer voltage Vtri1 to 210 V.

At time t2, the control unit 201 starts outputting the Hi/Lo signal from the TON_CLK terminal. Accordingly, the AC voltage Vton_ac becomes 150 Vpp. The primary transfer voltage Vtri1 increases to 210 V.

At time t3, the control unit 201 starts outputting the Hi/Lo signal from the T2P_CLK terminal. Accordingly, the positive voltage Vtri2_P increases to a desired value.

At time t4, the control unit 201 starts shutting down processing. That is, the control unit 201 stops outputting the signal from the TON_CLK terminal. Accordingly, the primary transfer voltage Vtri1 decreases to 0 V.

At time t5, the control unit 201 stops outputting the signal from the T2P_CLK terminal. Accordingly, the positive voltage Vtri2_P decreases to 0 V.

(3-2) Changes Over Time of Signals and Voltages when Electrostatic Capacitance Detection is not Executed FIG. 8B shows changes over time when the electrostatic capacitance detection is not executed. Note that, in FIG. 8B, portions that are different from FIG. 8A are rendered with thick lines.

At time t11, the control unit 201 performs setting regarding the TON_TGT terminal and T1_TGT terminal. The duty ratio of the signal to be output from the TON_TGT terminal is set to 77%. This corresponds to 60 Vpp of the AC voltage Vton_ac. The duty ratio of the signal to be output from the T1_TGT terminal is set to 65%. This corresponds to 210 V of the primary transfer voltage Vtri1.

At time t12, the control unit 201 starts outputting the Hi/Lo signal from the TON_CLK terminal. Accordingly, the AC voltage Vton_ac increases to 60 Vpp. At this point in time, the AC voltage Vton_ac is insufficient, and therefore the primary transfer voltage Vtri1 does not reach 210V, which is set by the T1_TGT terminal.

At time t13, the control unit 201 starts outputting the Hi/Lo signal from the T2P_CLK terminal. Accordingly, the positive voltage Vtri2_P increases to a desired value. As a result of being supported by the positive voltage Vtri2_P, the primary transfer voltage Vtri1 (more correctly, primary transfer voltage Vtri1*z*) reaches 210 V, which is the target voltage.

At time t14, the control unit 201 starts shutting down processing. That is, the control unit 201 stops outputting the signal from the TON_CLK terminal. Accordingly, the primary transfer voltage Vtri1 decreases to 0 V.

At time t15, the control unit 201 stops outputting the signal from the T2P_CLK terminal. Accordingly, the positive voltage Vtri2_P decreases to 0 V.

In Embodiment 2, the duty ratio of the TON_TGT terminal is supposed to be 77% (Vton_ac-60 Vpp) when the electrostatic capacitance detection is performed, but this is merely an example. The duty ratio of the signal from the TON_TGT terminal may also be set to 100% (corresponding to Vton_ac=0 Vpp) depending on the materials of the intermediate conveyance belt 135 and secondary transfer roller 141 and the configuration of the image forming apparatus 101, for example. That is, there may be a case where the AC voltage Vton_ac need not be output. The state in which the AC voltage Vton_ac is not output may also be expressed as a state in which the AC power supply 230 stops. The state in which the AC voltage Vton_ac is being output may also be expressed as a state in which the AC power supply 230 operates.

According to Embodiment 2, the output of the AC power supply 230 is increased when the control unit 201 performs the electrostatic capacitance detection. That is, the output of the AC power supply 230 is decreased when the control unit 201 is not performing the electrostatic capacitance detection. Accordingly, the power loss in the AC power supply 230 is reduced. The period of time in which the electrostatic capacitance detection is performed is about several tens of seconds, and this period is sufficiently short relative to the period of time in which the image forming apparatus 101 is executing image formation. Therefore, the rating of elements in Embodiment 2 is lower than the rating of elements for continuously operating the AC power supply 230. That is, the cost of the power supply apparatus of the image forming apparatus 101 can be reduced.

Embodiment 3

Embodiment 3 differs from Embodiment 1 in that the operation of the AC power supply 230 is changed according to whether or not the negative power supply 220 is generating the negative voltage Vtri2_N. In Embodiment 3, only the description regarding points that are different from Embodiment 1 will be given, and the description in Embodiment 1 is referred to as the description of points in common with Embodiment 1.

The positive voltage Vtri2_P also functions as an auxiliary power supply of the primary transfer voltage Vtri1*z*. When the secondary transfer voltage Vtri2 is in a negative polarity, conversely, the negative voltage Vtri2_N deprives the primary transfer voltage Vtri1*z* of power. Therefore, when the secondary transfer voltage Vtri2 is in a negative polarity, the AC power supply 230 needs to increase the AC voltage Vton_ac in order to obtain the primary transfer voltage Vtri1*z* relative to a normal state.

Figure 9A:
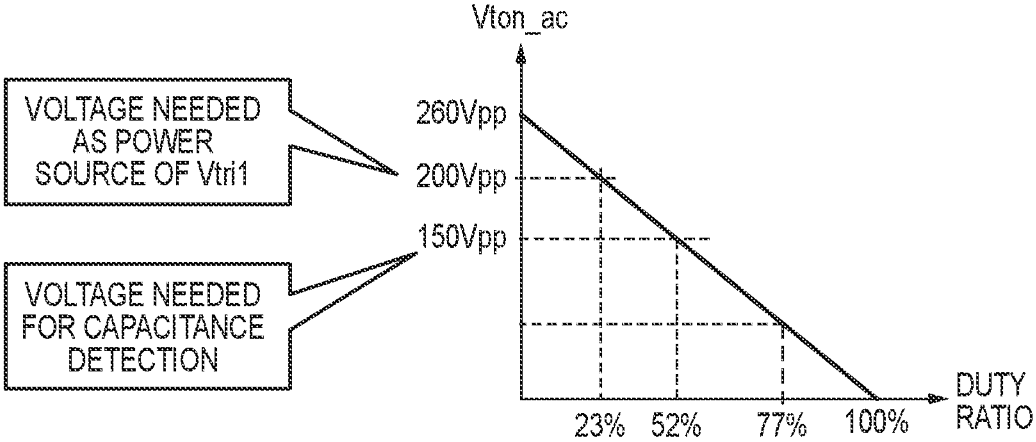
FIGS. 9A and 9B are a graph illustrating a relationship between the duty ratio and the output voltages, and a diagram illustrating changes over time of the various types of signals and the output voltages.

FIG. 9A is a graph illustrating a relationship between the duty ratio and the AC voltage Vton_ac.

When the secondary transfer voltage Vtri2 is in a negative polarity, the AC voltage Vton_ac needed to be a power source of the primary transfer voltage Vtri1*z* is 200 Vpp, for example. This corresponds to 23% of the duty ratio of the signal from the TON_TGT terminal. 200 Vpp is higher than 150 Vpp (duty ratio of the signal from the TON_TGT terminal=52%) that is the AC voltage Vton_ac needed for the electrostatic capacitance detection. Therefore, when the secondary transfer voltage Vtri2 is in a negative polarity, the AC power supply 230 generates the AC voltage Vton_ac of 200 Vpp, in order to keep the primary transfer voltage Vtri1*z* at the target voltage.

Figure 9B:
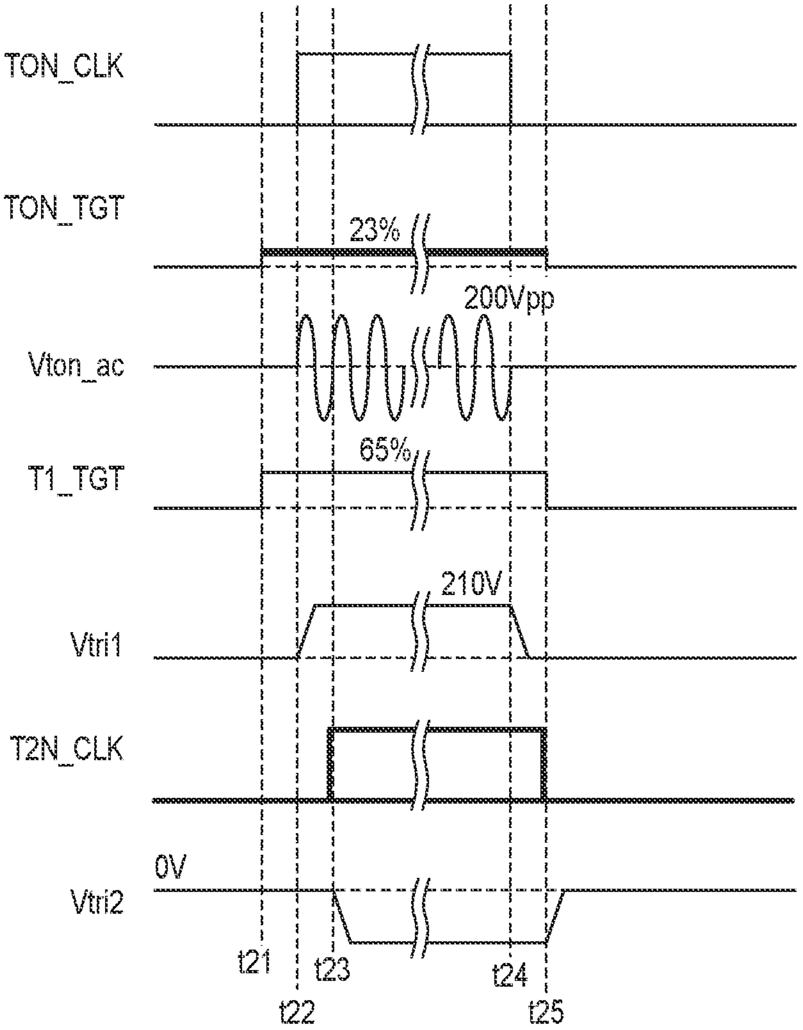

FIG. 9B is a graph illustrating changes over time of signals and voltages. In FIG. 9B, portions that are different from FIG. 8A are rendered with thick lines. The secondary transfer voltage Vtri2 in a negative polarity is needed when the control unit 201 executes color shift correction, when executing cleaning process, and the like.

At time t21, the control unit 201 performs setting regarding the TON_TGT terminal and T1_TGT terminal. The duty ratio of the signal to be output from the TON_TGT terminal is set to 23%. This corresponds to 200 Vpp of the AC voltage Vton_ac. The duty ratio of the signal to be output from the T1_TGT terminal is set to 65%. This corresponds to 210 V of the primary transfer voltage Vtri1.

At time t22, the control unit 201 starts outputting the Hi/Lo signal from the TON_CLK terminal. Accordingly, the AC voltage Vton_ac increases to 200 Vpp. The primary transfer voltage Vtri1 increases, and the primary transfer voltage Vtri1*z* that is actually acts on the primary transfer roller 136 increases to 210 V.

At time t23, the control unit 201 starts outputting the Hi/Lo signal from the T2N_CLK terminal. Accordingly, the secondary transfer voltage Vtri2 reaches a desired value.

At time t24, the control unit 201 starts shutting down processing. That is, the control unit 201 stops outputting the signal from the TON_CLK terminal. Accordingly, the primary transfer voltage Vtri1 decreases to 0 V.

At time t25, the control unit 201 stops outputting the signal from the T2N_CLK terminal. Accordingly, the secondary transfer voltage Vtri2 is returned to 0V.

According to Embodiment 3, when the secondary transfer voltage Vtri2 is in a negative polarity, the output of the AC power supply 230 is increased (Vton_ac=200 Vpp). On the other hand, when the secondary transfer voltage Vtri2 is in a positive polarity, the output of the AC power supply 230 is decreased (Vton_ac=150 Vpp). Accordingly, the power loss in the AC power supply 230 is reduced. Even if the secondary transfer voltage Vtri2 is in a negative polarity, the primary transfer voltage Vtri1 is kept at the target voltage, and the primary transfer is possible.

The period of time in which color shift correction is performed is sufficiently shorter than the image formation time. Therefore, in Embodiment 3, the rating of circuit elements can be reduced relative to that in the circuit conditions needed for continuously outputting the AC voltage Vton_ac at 200 Vpp. That is, the cost of the power supply apparatus of the image forming apparatus 101 can be reduced. Note that, in Embodiment 3, in a period in which capacitance detection is needed, the AC voltage Vton_ac is decreased to 60 Vpp.

Technical Concept Derived from Embodiments

Item 1

The photosensitive drum 131 is an example of a photosensitive member. The intermediate conveyance belt 135 is an example of an intermediate transfer member. The primary transfer roller is an example of a primary transfer member. The electrode plate 138 and electrode plate 139 are an example of a sensor. The DC power supply 260 is an example of a first DC power supply. As a result of the sensor and first DC power supply sharing one AC power supply, as described above, the cost and arrangement space of the power supply circuit that generates the primary transfer voltage can be reduced. Note that the first polarity and second polarity are determined according to the charged toner polarity. When the charged toner polarity is negative, the first polarity is positive, and the second polarity is negative. On the other hand, when the charged toner polarity is positive, the first polarity is negative, and the second polarity is positive.

Item 2

The secondary transfer roller 141 is an example of a secondary transfer member. The positive power supply 210 is an example of a second DC power supply. Here, the primary transfer voltage Vtri1*z* to be actually applied to the primary transfer member is formed by the DC voltage (Vtri1) in a first polarity, and the DC voltage (Vtri2*z*) that is generated as a result of the second DC voltage (Vtri2_P) in a first polarity suffering from a voltage drop occurring in the intermediate transfer member. As described above, when the primary transfer voltage is in a negative polarity, a circuit for generating the secondary transfer voltage is utilized. Accordingly, the cost and arrangement space of the power supply circuit that generates the primary transfer voltage can be reduced.

Item 3

The control unit 201 can be realized by a CPU (central processing unit), a processor, or a logic circuit, and the control unit 201 is an example of a control circuit. As shown in FIG. 7B, a first target voltage may be 150 Vpp, for example. A second target voltage may be 60 Vpp. Here, the period of time in which the first target voltage is adopted is shorter than the period of time in which the second target voltage is adopted, and therefore the rating of circuit elements needed for configuring the AC power supply can be reduced. That is, the cost of the power supply circuit may further be reduced.

Item 4

As described in Embodiment 2, there are cases where, with only the DC voltage (Vtri2*z*) originated from the positive voltage Vtri2_P output from the positive power supply 210, the primary transfer voltage Vtri1*z* can be supplied. In this case, the control unit 201 may stop the DC power supply 260 by stopping the AC power supply 230. With this, the power loss may be reduced.

Item 5

The cleaning blade 142 is an example of a cleaning member. The negative power supply 220 is an example of a third DC power supply. The polarity of the negative voltage Vtri2_N output in cleaning process is opposite to the polarity of the primary transfer voltage Vtri1*z*. Then, the AC voltage is controlled to a third target voltage (e.g., 200 Vpp). Accordingly, the primary transfer voltage Vtri1*z* is kept at the target voltage, and the performance of primary transfer of toner images is maintained.

Item 6

The image sensor 143 is an example of an image reader. The test image formed for color shift correction is not transferred to a sheet P, as described above, and as a result, a portion of the test image may attach to the secondary transfer member. Therefore, the negative voltage Vtri2_N is needed in order to clean the test image.

Item 7

As shown in FIG. 4, the capacitance detection circuits 251*a* to 251*d* are an example of an acquisition circuit. That is, the electrostatic capacitance changes according to the amount of toner that is present between the electrode plate 138 and electrode plate 139, and the AC current generated in the electrode plate 139 changes. That is, the capacitance detection circuits 251*a* to 251*d* each acquire an AC current, and with this, the electrostatic capacitance can be measured based on the AC current.

Item 8

As FIG. 4 shows, the capacitance detection circuits 251*a* to 251*d* may be realized by peak hold circuits. Accordingly, the capacitance detection circuits 251*a* to 251*d* can be realized with relatively simple circuits. Note that the peak hold circuit may adopt a higher performance circuit configuration such as using an operational amplifier.

Item 9

As FIG. 5 illustrates, the DC power supply 260 may be realized by the stepping up circuit (rectifying and smoothing circuit) including the diodes D61 to D64 and the capacitors C61 to C64. The primary transfer voltage Vtri1 is a high voltage, and therefore the stepping up circuit is needed.

Item 10

The Cockcroft-Walton Circuit can perform a stepping up operation with a relatively small number of circuit elements. Therefore, as a result of the DC power supply 260 adopting the Cockcroft-Walton Circuit, the cost of the DC power supply 260 can be reduced.

Item 11

The control unit 201 and the operational amplifier IC61 and the like that control the current flowing through the resistor R61 are an example of a current control circuit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-019467, filed Feb. 10, 2023, which is hereby incorporated by reference herein in its entirety.

What is claimed is:

1. An image forming apparatus comprising:

a toner container that contains toner;

a photosensitive member on which a toner image is formed with the toner supplied from the toner container;

an intermediate transfer member that has conductivity and rotates while in contact with the photosensitive member;

a primary transfer member that is applied with a primary transfer voltage and transfers the toner image from the photosensitive member to the intermediate transfer member;

a sensor that is provided in the toner container and is configured to detect information regarding a remaining amount of the toner contained in the toner container;

an AC power supply configured to supply an AC voltage to the sensor;

a first DC power supply configured to generate a DC voltage in a first polarity by converting the AC voltage output from the AC power supply, and apply the DC voltage in the first polarity to the primary transfer member;

a secondary transfer member that rotates while in contact with the intermediate transfer member, is applied with a secondary transfer voltage, and transfers the toner image from the intermediate transfer member to a sheet; and a second DC power supply configured to generate a second DC voltage in the first polarity, and apply the second DC voltage in the first polarity to the secondary transfer member as the secondary transfer voltage, wherein the primary transfer voltage is formed with:

the DC voltage in the first polarity that is applied to the primary transfer member from the first DC power supply, and a DC voltage that is generated by the second DC power supply in the first polarity suffering from a voltage drop occurring in the intermediate transfer member in a route from the second DC power supply to the primary transfer member via the secondary transfer member and the intermediate transfer member.

2. The image forming apparatus according to claim 1, further comprising:

a controller circuit configured to control the AC power supply, wherein the controller circuit is further configured to keep the primary transfer voltage at a fixed voltage by:

controlling, when detecting information regarding a remaining amount of the toner by the sensor, the AC power supply such that the AC voltage becomes a first target voltage, and controlling, when not detecting information regarding a remaining amount of the toner by the sensor, the AC power supply such that the AC voltage becomes a second target voltage that is lower than the first target voltage.

3. The image forming apparatus according to claim 1, further comprising:

a controller circuit configured to control the AC power supply, wherein the controller circuit is further configured to keep the primary transfer voltage at a fixed voltage by:

controlling, when detecting information regarding a remaining amount of the toner by the sensor, the AC power supply such that the AC voltage becomes a first target voltage, and controlling, when not detecting information regarding a remaining amount of the toner by the sensor, the AC power supply to stop outputting the AC voltage.

4. The image forming apparatus according to claim 2, further comprising:

a cleaning member configured to clean toner remaining on the intermediate transfer member; and a third DC power supply that is connected in series to the second DC power supply, and is configured to generate a third DC voltage in a second polarity that is opposite to the first polarity, and apply the third DC voltage in the second polarity to the secondary transfer member as the secondary transfer voltage, wherein the controller circuit is further configured to, in a cleaning process in which the secondary transfer member is cleaned by returning toner attached to the secondary transfer member to the intermediate transfer member, and removing the toner from the intermediate transfer member by the cleaning member:

stop the second DC power supply, cause the third DC power supply to operate, and control the AC power supply such that the AC voltage becomes a third target voltage that is higher than the first target voltage.

5. The image forming apparatus according to claim 4, further comprising:

an image reader configured to read a test image formed on the intermediate transfer member, wherein the cleaning process includes performing cleaning of a portion of the test image that is attached to the secondary transfer member.

6. The image forming apparatus according to claim 1, wherein the sensor includes:

a first electrode plate that is disposed inside the toner container and is applied with the AC voltage;

a second electrode plate that is disposed inside the toner container; and an acquisition circuit configured to acquire an AC current generated in the second electrode plate according to the information regarding a remaining amount of the toner, by applying the AC voltage to the first electrode plate.

7. The image forming apparatus according to claim 6, wherein the acquisition circuit is a peak hold circuit.

8. An image forming apparatus comprising:

a toner container that contains toner;

a photosensitive member on which a toner image is formed with the toner supplied from the toner container;

an intermediate transfer member that has conductivity and rotates while in contact with the photosensitive member;

a primary transfer member that is applied with a primary transfer voltage and transfers the toner image from the photosensitive member to the intermediate transfer member;

a sensor that is provided in the toner container and is configured to detect information regarding a remaining amount of the toner contained in the toner container;

an AC power supply configured to supply an AC voltage to the sensor; and a DC power supply configured to generate a DC voltage in a given polarity by converting the AC voltage output from the AC power supply, and apply the DC voltage in the given polarity to the primary transfer member, wherein the DC power supply is a stepping-up circuit that includes a rectification element that rectifies the AC voltage output from the AC power supply and a capacitive element for generating a direct current by smoothing a pulsating current generated by the rectification element.

9. The image forming apparatus according to claim 8, wherein the stepping-up circuit is a Cockcroft-Walton circuit.

10. The image forming apparatus according to claim 8, further comprising:

a resistor connected between the stepping-up circuit and the primary transfer member; and a current control circuit configured to control a current caused to flow to the resistor, wherein the DC voltage in the given polarity is adjusted by the current control circuit controlling the current caused to flow to the resistor.

11. A power supply apparatus comprising:

an AC power supply that is configured to supply an AC voltage to a sensor that is provided in a toner container and detects information regarding a remaining amount of toner contained in the toner container;

a first DC power supply configured to generate a DC voltage in a given polarity by converting the AC voltage output from the AC power supply, and apply the DC voltage in the given polarity to a primary transfer member; and a second DC power supply configured to generate a second DC voltage in the given polarity, and apply the second DC voltage in the given polarity to a secondary transfer member, wherein a primary transfer voltage to be applied to the primary transfer member is formed with:

the DC voltage in the given polarity that is applied to the primary transfer member from the first DC power supply, and a DC voltage that is generated by the second DC power supply in the given polarity suffering from a voltage drop occurring in an intermediate transfer member in a route from the second DC power supply to the primary transfer member via the secondary transfer member and the intermediate transfer member.

* * * * *